Dec. 30, 1952 M. W. BAKER ET AL 2,623,676
PAN FILLING MACHINE
Filed Sept. 24, 1949 2 SHEETS—SHEET 1
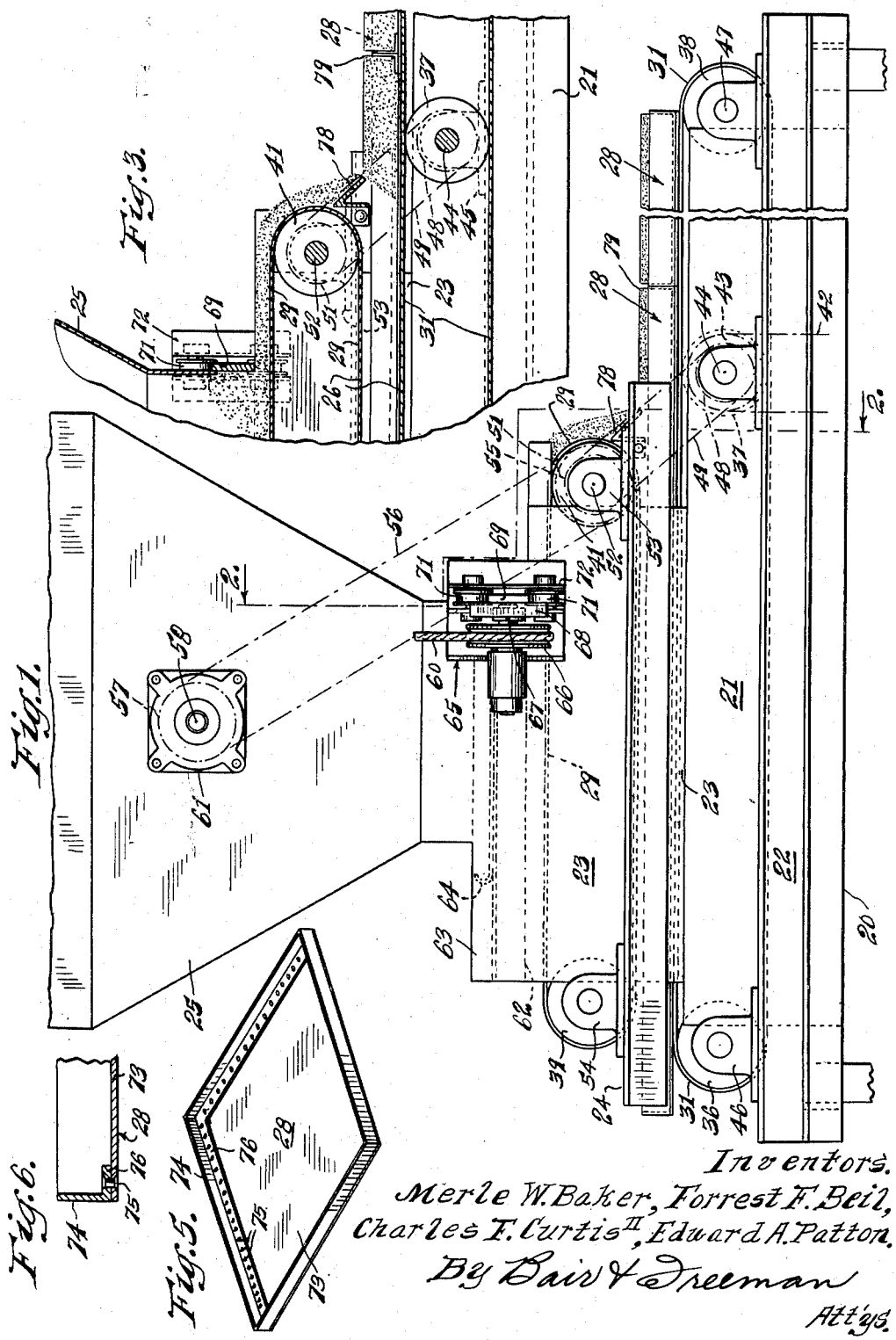
Inventors.
Merle W. Baker, Forrest F. Beil,
Charles T. Curtis II, Edward A. Patton.
By Bair & Freeman
Att'ys.

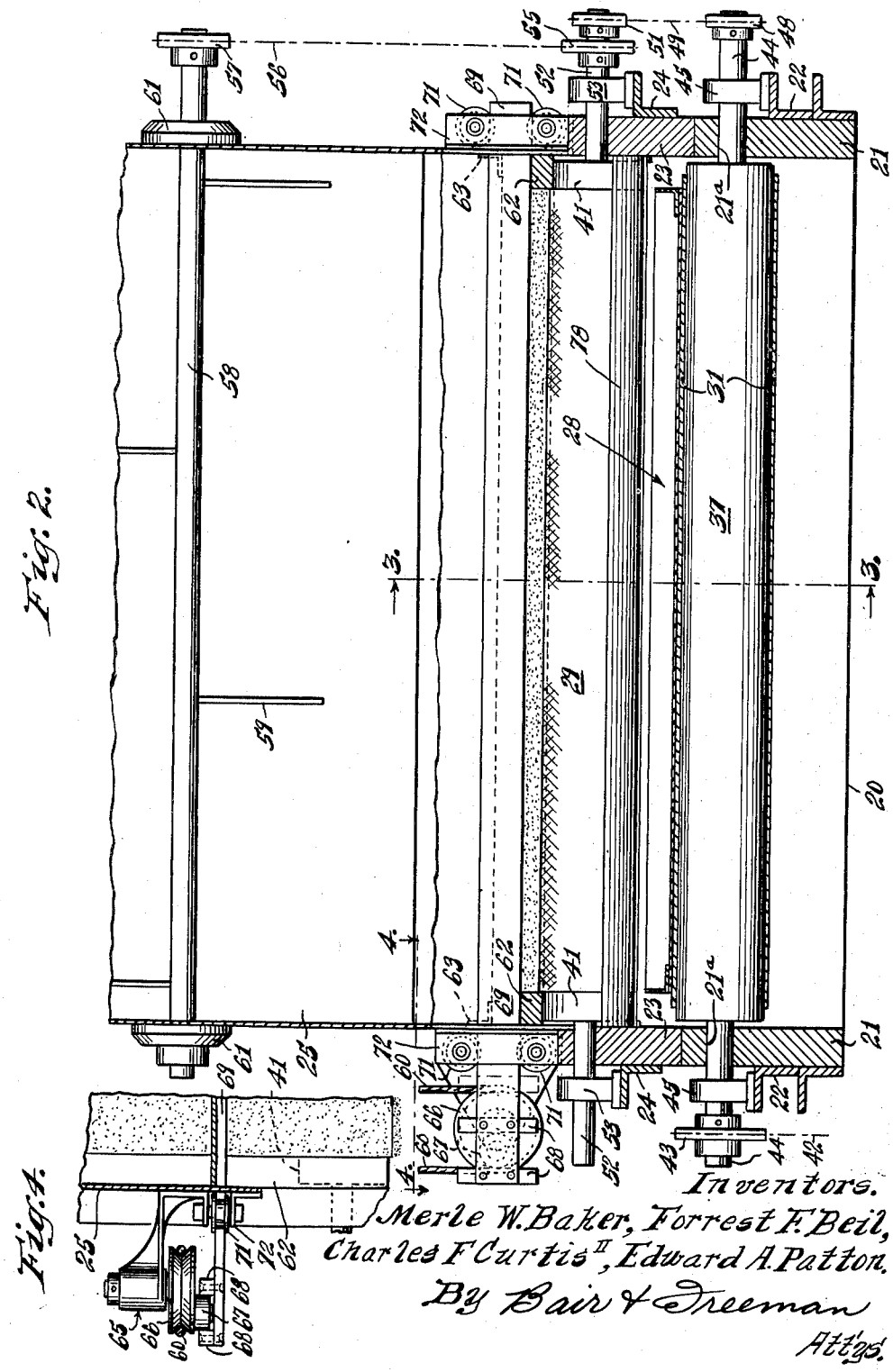

Patented Dec. 30, 1952

2,623,676

UNITED STATES PATENT OFFICE 2,623,676

PAN FILLING MACHINE

Merle W. Baker, Sioux City, and Forrest F. Beil, Charles F. Curtis, II, and Edward A. Patton, Clinton, Iowa, assignors to Curtis Companies Incorporated, Clinton, Iowa, a corporation of Iowa Application September 24, 1949, Serial No. 117,634

7 Claims. (Cl. 226—95)

1

This invention relates to a machine for filling shallow pans with a layer of granular material of uniform thickness and is a continuation-in-part of our application, Serial No. 59,902, filed November 13, 1948.

Reference is made to our copending application Serial No. 28,158 entitled "Board of Compressed Cellulose Material and Method for Manufacturing the Same," filed May 20, 1948, now forfeited. The method disclosed in said copending application involves the filling, with granular material, of a pan that is subject to being warped or twisted or may be provided with marginal shelves or ledges or may be formed with a central shallow depression. Nevertheless, the granular material is to be distributed over the bottom of said pan as a layer of uniform thickness. The problem of filling such pans with a layer of granular material of uniform thickness is also encountered in other processes, particularly where molding of the granular material contained in the pans is to be carried out.

It is therefore an important object of the present invention to provide a pan-filling machine which will assure a uniform depth of granular material being placed in the pan regardless of any warping, twisting or other deviations in the pan bottom from flatness.

It is also an object of the invention to provide a pan filling machine which is adapted to fill a number of successive pans with granular material of uniform thickness and to insure that each pan, particularly at the edges thereof, is filled uniformly.

With these and other objects in view, the invention consists in the construction, arrangement and combinations of various parts of our device wherein the objects contemplated are attained, as hereinafter more fully set forth, pointed out in the claims, and illustrated in the accompanying drawings, wherein:

Figure 1 is a side elevation of the pan filling machine;

Figure 2 is a partial vertical sectional view of the machine shown in Figure 1;

Figure 3 is an enlarged sectional view of a part of the machine showing the feed of the granular material to the pans and is taken on line 3—3 of Figure 2;

Figure 4 is a sectional view of the machine taken on line 4—4 of Figure 2;

Figure 5 is a perspective view of a pan to be filled; and

Figure 6 is an enlarged section view of the pan.

Referring specifically to the drawings for a detailed description of the invention, numeral 20 designates an elongated table for supporting the pan filling machine. Side members 21 extend upwardly from the long margins of the table top and have angle irons 22 affixed to the outsides thereof. Additional shorter side members 23 rest on the tops of the members 21 and have angle irons 24 attached to the outsides thereof. A hopper 25 is supported from the tops of the side members 23.

The hopper 25 serves as a receptacle for granular material and delivers the same to a belt system described in greater detail hereinbelow. The pans which are filled by the machine are shown generally at 26. A continuous belt 29 is provided for conveying the granular material to the pans. A second continuous belt 31 is provided for conveying the pans. Three (or more) rollers 36, 37 and 38 are provided for guiding and driving the lower continuous belt 31. Two rollers 39 and 41 are provided for guiding and driving the upper continuous belt 29. The roller 37 for belt 31 is driven by a chain 42, which engages a sprocket 43 connected to a shaft 44 for the roller 37. Bearings 45 are supported on each angle iron 22 for the shaft 44. The shaft 44 extends through apertures 21a in the side members 21. The chain 42 is driven from any suitable source of power, such as an electric motor (not shown). Two additional sets of bearings 46 and 47 are supported on each angle iron 22 to accommodate the rollers 36 and 38, respectively.

The shaft 44 for the roller 37 is provided with a sprocket 48 at one end thereof which drives a chain 49 engageable with a sprocket 51, which is secured to a shaft 52 for the roller 41. A bearing 53 is supported on each of the angle irons 24 for the shaft 52, and a bearing 54 is supported from each of the angle irons 24 for the shaft or roller 39.

A second sprocket 55 is secured to shaft 52 and drives a chain 56, which engages with a sprocket 57 secured to a shaft 58 for driving a stirring device having stirring rods or fingers 59. The rotation of the fingers 59 maintains the mixed pulverized material in the hopper 25 in loose condition, so that it will fall by gravity onto the belt 29. Bearings 61 are provided on each side of the machine for the shaft 58 of the mixing device.

A member 62 is provided at each side of the machine adjacent the upper reach of the belt 29, in order to guide the belt, and also to prevent mixed pulverized material from spilling off the sides of the belt. Angle irons 63 are secured to the hopper 25, and a slide 64 is guided by the angle irons 63. Obviously, the slide 64 may be moved to open or close the outlet from the hopper 25 the desired amount, so that approximately the proper amount of mixed pulverized material will be delivered to the belt 29.

A doctor bar assembly is shown generally at 65, and comprises a pulley 66 adapted to be driven by a V-belt 60 from any suitable source of power, preferably the same electric motor which operates the other parts of the pan filling machine. A rotatable ball bearing member 67 is eccentrically connected to the pulley 66, and a pair of guide members 68 are engaged by the ball bearing member 67 to impart reciprocating motion to the doctor bar 69, to which the guide members 68 are secured. The doctor bar 69 is reciprocated between rollers 71 provided on both sides of the machine. The rollers are supported in a pair of brackets 72.

The pan 28 may comprise a flat base member 73 which has an angle shaped flange 74 secured thereto by rivets 75. The horizontal portion 76 of the angle 74 overlies the base plate 73 for the purpose described in said copending application. The granular material is shown in Figure 4 by the numeral 77.

A V-shaped baffle device 78 is positioned adjacent the lower portion of roller 41 in an inverted position to better distribute the granular material as it falls from belt 29. It has been found that such a baffle distributes the granular material more evenly in successive pans, particularly near the edges thereof which are parallel to the axis of roller 41.

Figure 3 of the drawings shows the action of the baffle 78 on the granular material falling into successive pans. As shown, the material tends to be deflected by the baffle and thus insure uniform thickness of material adjacent the leading edge particularly of the pans 28, which edge is designated by numeral 79.

In the operation of the above described machine, the mixing device 59 maintains a granular material in loose form. The slide 64 is first adjusted to control the amount of granular material which is to be delivered to the belt 29. The pans 28 are filled with a uniform depth of granular material, regardless of any warping or twisting or other deviations of the bottom of the pan from flatness. This is accomplished by delivering a pre-determined thickness of the granular material on the belt 29 carried by the two upper rollers 39 and 41.

The belt 29 carries the material toward the right, as viewed in Figure 1, so that the material is discharged from the right hand end of the upper reach of the belt 29 into the pans 28 and is further evenly distributed by baffle 78. The pans 28 are carried along successively toward the right, as viewed in Figure 1, by the upper reach of the belt 31. As stated before, the belt 31 is carried and driven by the three lower rollers 36, 37 and 38. The speed of the belts 29 and 31 is synchronized to produce a uniform thickness of mixed material in the pan.

The belts 29 and 31 may also be driven in opposite directions. As a matter of fact, driving the two belts in opposite directions prevents stratification of material in the pans. Thus, when the two belts are driven in the same direction, the finer particles of the deposited material tend to be concentrated near the bottom surface of the pans. When the two belts are driven in opposite directions, no such stratification of relatively fine material occurs.

As the material falls from the hopper 25 onto the belt 29, the doctor bar 69 is reciprocated back and forth to smooth off the material and insure that the proper thickness is delivered to the trays 28. The doctor bar 69 is adjustable vertically by any suitable means (not shown), in order to vary the thickness of the material which is delivered to the belt 29. Obviously, it is not desirable to deliver too much excess material to the belt 29. The slide 64 permits the operator to control this factor.

If the thickness of the material delivered to the belt 29 is uniform, then a uniform thickness of material will cover every part of the bottom of the pan 28 particularly when baffle 78 is utilized. Therefore, if the pan is warped, the amount of material delivered to the warped portion is unchanged, and the thickness and density of the product will be the same throughout.

Some changes may be made without departing from the real spirit and purpose of our invention, and it is our intention to cover by our claims any modified forms which may be reasonably included within their scope without sacrificing any of the advantages thereof.

We claim as our invention:

1. Apparatus for delivering granulated material to containers having a substantially flat lower surface comprising an upper belt conveyor having an upper and a lower reach, a lower conveyor extending beyond one extremity of said upper belt conveyor in the direction of movement of the upper reach of said upper conveyor, means for moving said conveyors at a predetermined relative speed, means for disposing a uniform layer of said material of predetermined thickness on said upper belt, said lower conveyor being adapted to move said containers successively in one direction, said material from said upper belt falling therefrom into said containers as said conveyors are moved, said disposing means including a bar mounted a predetermined distance above the upper reach of said upper belt conveyor in a position to level off said material after it is fed to said upper belt conveyor and means for horizontally reciprocating said bar.

2. Apparatus for delivering granulated material to containers having a substantially flat lower surface comprising an upper belt conveyor having an upper and a lower reach, a lower conveyor extending beyond one extremity of said upper belt conveyor in the direction of movement of the upper reach of said upper conveyor, means for moving said conveyors at a predetermined relative speed, and means for disposing a uniform layer of said material of predetermined thickness on said upper belt, said lower conveyor being adapted to move said containers successively in one direction, said material from said upper belt falling therefrom into said containers as said conveyors are moved and a pair of horizontally extending members disposed adjacent the moving edges of the upper reach of said upper belt conveyor.

3. Apparatus for delivering granulated material to containers having a substantially flat lower surface comprising an upper and a lower conveyor each having upper and lower reaches, said lower conveyor extending beyond one extremity of said upper conveyor in the direction of movement of the upper reach of said upper conveyor, means for moving said conveyors at a predetermined relative speed, and means for disposing a uniform layer of said material of predetermined thickness on said upper conveyor, said lower conveyor being adapted to move said containers successively in one direction, said material from said upper conveyor falling therefrom into said containers as said conveyors are moved, said last means including a baffle plate extending across the upper conveyor in the path of the falling material.

4. Apparatus for delivering granulated material to containers having a substantially flat lower surface comprising an upper belt conveyor having an upper and a lower reach, a lower conveyor extending beyond one extremity of said upper belt conveyor in the direction of movement of the upper reach of said upper conveyor, means for moving said conveyors in the same direction and at a predetermined relative speed, and means for disposing a uniform layer of said material of predetermined thickness on said upper belt, said lower conveyor being adapted to move said containers successively in one direction, said material from said upper belt falling therefrom into said containers as said conveyors are moved, said disposing means including a bar mounted a predetermined distance above the upper reach of said upper belt conveyor in a position to level off said material after it is fed to said upper belt conveyor, said disposing means also including a baffle disposed adjacent the upper belt conveyor in the path of the falling material.

5. Apparatus for delivering granulated material to containers having a substantially flat lower surface comprising an upper belt conveyor having an upper and a lower reach, a lower conveyor extending beyond one extremity of said upper belt conveyor in the direction of movement of the upper reach of said upper conveyor, means for moving said conveyors at a predetermined relative speed, means for disposing a uniform layer of said material of predetermined thickness on said upper belt, said lower conveyor being adapted to move said containers successively in one direction, said material from said upper belt falling therefrom into said containers as said conveyors are moved, said disposing means including a bar mounted a predetermined distance above the upper reach of said upper belt conveyor in a position to level off said material after it is fed to said upper belt conveyor and means for horizontally reciprocating said bar, said disposing means also including a baffle disposed adjacent the upper belt conveyor in the path of the falling material.

6. Apparatus for delivering granulated material to containers having a substantially flat lower surface comprising an upper and a lower belt conveyor having upper and lower reaches, said lower belt conveyor extending beyond one extremity of said upper belt conveyor in the direction of movement of the upper reaches of said conveyors, means for moving said belt conveyors at a predetermined relative speed, and means for disposing a uniform layer of said material of predetermined thickness on said upper belt, said lower belt being adapted to move said containers successively in one direction, said material from said upper belt falling therefrom into said containers as said belts are moved, said disposing means including a hopper adapted to discharge said material onto the upper reach of said upper belt conveyor, a pair of horizontally extending members disposed adjacent the moving edges of the upper reach of said upper belt conveyor and a bar mounted a predetermined distance above the upper reach of said upper belt conveyor in a position to level off said material after it is fed to said upper belt conveyor, said disposing means also including a baffle disposed adjacent the upper belt conveyor in the path of the falling material.

7. Apparatus for delivering granulated material to containers having a substantially flat lower surface comprising an upper belt conveyor having an upper and a lower reach, a lower conveyor extending beyond one extremity of said upper belt conveyor in the direction of movement of the upper reach of said upper conveyor, means for moving said conveyors in opposite directions and at a predetermined relative speed, and means for disposing a uniform layer of said material of predetermined thickness on said upper belt, said lower conveyor being adapted to move said containers successively in one direction, said material from said upper belt falling therefrom into said containers as said conveyors are moved, said disposing means including a bar mounted a predetermined distance above the upper reach of said upper belt conveyor in a position to level off said material after it is fed to said upper belt conveyor, said disposing means also including a baffle disposed adjacent the upper belt conveyor in the path of the falling material.

MERLE W. BAKER.
FORREST F. BEIL.
CHARLES F. CURTIS, II.
EDWARD A. PATTON.

REFERENCES CITED

The following references are of record in the file of this patent:

UNITED STATES PATENTS

| Number | Name | Date |
|---|---|---|
| 1,103,333 | Weeks | July 14, 1914 |
| 1,777,670 | Hausman | Oct. 7, 1930 |
| 2,273,735 | Raymer | Feb. 17, 1942 |